Dec. 15, 1931.　　　R. A. BEACH　　　1,836,523
DRINK MIXER
Filed Aug. 18, 1930
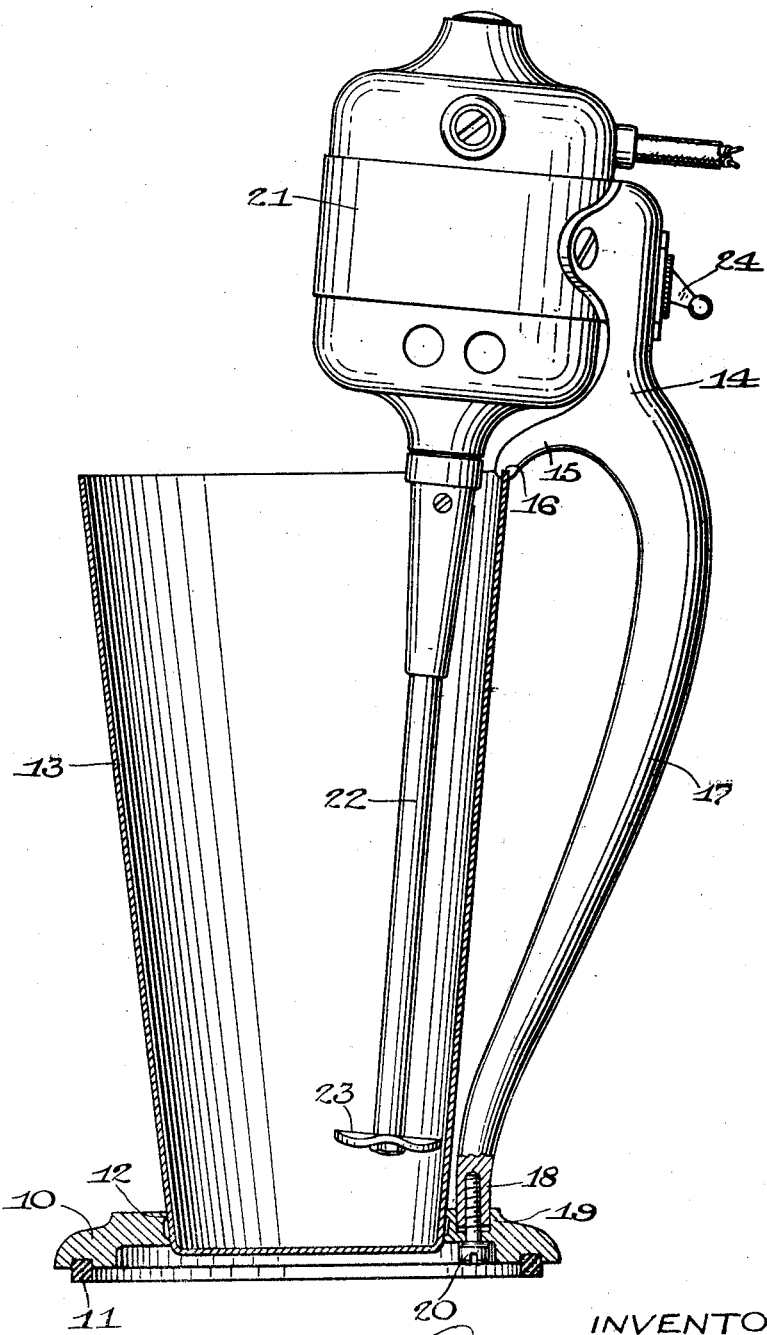
WITNESSES
M. E. Downey
E. L. Waal
INVENTOR
Royal A. Beach
By R. H. Caldwell
ATTORNEY Patented Dec. 15, 1931

1,836,523

UNITED STATES PATENT OFFICE

ROYAL A. BEACH, OF RACINE, WISCONSIN

DRINK MIXER

Application filed August 18, 1930. Serial No. 476,027.

This invention relates to drink mixers, and has for an object the provision of a drink mixer in which the driving motor for the agitator is mounted in permanent relation to the mixing receptacle to form a unitary assembly, thereby simplifying construction and rendering the device sanitary in use.

Another object of the invention is to provide a drink mixer embodying a motor bracket which has the mixing receptacle permanently secured thereto and which forms a handle by which the device is lifted and tilted for pouring the contents of the receptacle.

A further object of the invention is to provide a drink mixer including a motor switch adjacent the handle to permit lifting of the device and control of the motor by one hand.

The invention further consists in the several features hereinafter set forth and more particularly defined by the annexed claims.

The accompanying drawing shows a sectional elevation of a drink mixer embodying the invention.

In the drawing, the numeral 10 designates an annular base which is provided with a bottom ring 11 of yielding material for engagement with a support, such as a counter or table. A seat or socket 12 having sloping walls is formed in the base 10 to wedgingly receive therein the tapered lower side walls of a mixing cup or receptacle 13.

A motor bracket 14 includes an arm 15 near its upper portions provided with a downwardly opening notch or channel 16 within which fits the upper edge of the receptacle 13. The bracket 14 includes a curved handle portion 17 spaced from the receptacle and having a vertical extending lower end portion 18 which slidably fits within an upwardly opening aperture 19 formed in the base 10. A screw 20 passes through a reduced portion of the aperture 19 and is threaded into the lower portion 18 of the motor bracket to secure the bracket to the base and to permanently clamp the receptacle 13 between the base and the bracket arm 15.

An electric motor 21 is mounted on the upper end of the bracket 14 and drives a rotary agitator shaft 22 which depends into the receptacle and carries an agitator or stirring element 23 at its lower end. The agitator shaft is preferably disposed adjacent the side wall of the receptacle to permit free access to the upper end of the receptacle. A switch 24, here indicated to be of the toggle type, is carried at the upper end of the bracket 14 for controlling the motor.

When in use, the drink mixer is placed on a suitable support and the drink ingredients are introduced into the receptacle 13. The motor-driven agitator is then started in operation by closing the switch 24. When the mixing operation is finished the handle 17 is grasped by one hand of the user to lift the device and to pour the contents from the receptacle. The motor may be left running during the pouring to provide further mixing. To stop the motor the switch 24 is opened by the thumb of the hand which grasps the handle, thus permitting one-hand operation. To clean the device it is only necessary to pour hot water into the receptacle and to operate the motor, thus cleaning both the receptacle and the agitator.

By reason of the unitary character of the device, the construction is materially simplified and economical manufacture is made possible. Since the receptacle remains in permanent relation to the motor, the shaft and agitator are less exposed to dust and insects and are protected from mechanical injury.

The term "permanent", as herein used with respect to the attachment of the receptacle to the motor, refers to the relation of the parts existing in the normal use of the drink mixer, although the parts may be separably connected for purposes of assembly in manufacture.

What I claim as new and desire to secure by Letters Patent is:

1. In a drink mixer, the combination of a motor, an agitator shaft depending from the motor, a receptacle receiving said agitator shaft therein, a base having a recess receiving the bottom portion of said receptacle and formed with sloping walls wedgingly engaging the lower side walls of said receptacle, a bracket secured to said motor and having a recessed portion engaging the upper edge of said receptacle, and means for securing said bracket to said base and permanently clamping said receptacle between said base and the recessed portion of said bracket.

2. In a drink mixer, the combination of a motor, an agitator shaft depending from the motor, a receptacle receiving said agitator shaft therein, a base engaging the lower portions of said receptacle, a bracket secured to said motor and engaging the upper portions of said receptacle, said bracket and base having relatively slidable interengaging parts, and a screw connecting said interengaging parts to secure said bracket to said base and to permanently clamp said receptacle between said base and said bracket.

3. In a drink mixer, the combination of a base having a recess therein, a receptacle having its bottom portion mounted in said recess, a handle member fastened to said base and diverging from the receptacle and having an arm resting on the receptacle to permanently hold the receptacle in the recess of said base, and a motor mounted on said handle member and carrying a stirring shaft extending into the receptacle.

In testimony whereof, I affix my signature.

ROYAL A. BEACH.